(12) United States Patent
Eron (10) Patent No.: US 9,228,098 B2
(45) Date of Patent: *Jan. 5, 2016

(54) DIGITAL INK-JET GLASS PRINTER

(71) Applicant: DIP TECH. LTD, Kfar Saba (IL)

(72) Inventor: Gera Eron, Tel Mond (IL)

(73) Assignee: DIP TECH. LTD., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,199

(22) Filed: Jan. 3, 2013

(65) Prior Publication Data

US 2013/0187983 A1    Jul. 25, 2013

Related U.S. Application Data

(63) Continuation of application No. 13/180,949, filed on Jul. 12, 2011, now Pat. No. 8,603,589, which is a continuation of application No. 10/569,468, filed as application No. PCT/IL2004/000776 on Aug. 25, 2004, now Pat. No. 7,976,906.

(60) Provisional application No. 60/497,311, filed on Aug. 25, 2003.

(51) Int. Cl.
| | | |
|---|---|---|
| *B05D 1/32* | (2006.01) | |
| *C09D 11/30* | (2014.01) | |
| *B41J 3/28* | (2006.01) | |
| *B41J 3/407* | (2006.01) | |
| *B41J 11/00* | (2006.01) | |
| *B41M 5/00* | (2006.01) | |
| *B41J 2/01* | (2006.01) | |
| *B41M 7/00* | (2006.01) | |

(52) U.S. Cl.
CPC . *C09D 11/30* (2013.01); *B41J 2/01* (2013.01); *B41J 3/28* (2013.01); *B41J 3/407* (2013.01); *B41J 11/002* (2013.01); *B41J 11/0015* (2013.01); *B41J 11/0095* (2013.01); *B41M 5/007* (2013.01); *B41M 5/0047* (2013.01); *B41M 7/009* (2013.01); *B41M 7/0081* (2013.01)

(58) Field of Classification Search
CPC ............................. B41J 3/407; B41J 11/0015
USPC ........... 427/466, 475, 511; 347/100, 102, 104
See application file for complete search history.

(56) References Cited

U.S. PATENT DOCUMENTS

| | | | | |
|---|---|---|---|---|
| 6,715,871 | B2 * | 4/2004 | Hashimoto et al. | 347/102 |
| 7,976,906 | B2 * | 7/2011 | Eron | 427/466 |
| 2002/0006299 | A1 * | 1/2002 | Anagnostopoulos et al. | 400/118.2 |
| 2003/0063155 | A1 * | 4/2003 | Nakao et al. | 347/44 |
| 2003/0112407 | A1 * | 6/2003 | Nakano et al. | 349/187 |
| 2003/0142167 | A1 * | 7/2003 | Nakamura et al. | 347/37 |
| 2004/0006159 | A1 * | 1/2004 | Horie et al. | 523/160 |
| 2004/0137652 | A1 * | 7/2004 | Ishii | 438/22 |
| 2005/0018026 | A1 * | 1/2005 | Nerad et al. | 347/102 |
| 2006/0230969 | A1 * | 10/2006 | Vosahlo | 101/488 |
| 2013/0222498 | A1 * | 8/2013 | Eron | 347/100 |

*Primary Examiner* — Binh X Tran

* cited by examiner (74) *Attorney, Agent, or Firm* — Smith Risley Tempel Santos LLC; Gregory Scott Smith (57) ABSTRACT

A method and system for printing on glass boards is provided. The method may include jetting, from an inkjet printing system onto a glass board, a glass-based ink having solid glass particles to form a printed glass board; heating the glass board prior to jetting the glass-based ink; heating the glass board after jetting to fix the ink onto the glass board; conveying the printed glass board to a furnace; and firing the printed glass board in the furnace at temperature of no less than 550.degree. C. to melt the solid glass particles onto the glass board and complete fixation of the glass-based ink.

5 Claims, 8 Drawing Sheets

Section A-A

FIG. 7A

DIGITAL INK-JET GLASS PRINTER

CROSS-REFERENCE TO RELATED APPLICATIONS

This application is a continuation of the United States patent application that was filed on Jul. 12, 2011 and assigned Ser. No. 13/180,949, now U.S. Pat. No. 8,603,589, which application is a continuation of the United States patent application that was filed on Jul. 11, 2006, assigned Ser. No. 10/569,468, bearing the title of "DIGITAL INK-JET GLASS PRINTER" and now issued as U.S. Pat. No. 7,976,906, which application and patent are a National Phase filing of PCT International Application No. PCT/IL2004/00776 filed on Aug. 25, 2004 and bearing the title of "DIGITAL INK-JET GLASS PRINTER" which in turn claims priority from the United States Provisional Application that was filed on Aug. 25, 2003 and assigned Ser. No. 60/497,311, all of which are incorporated herein by reference in their entirety. As such, the priority date for this application is Aug. 25, 2003.

FIELD OF THE INVENTION

The present invention relates to the field of glass printing, and especially to printing on flat safety glass.

BACKGROUND OF THE INVENTION

Printing on flat glass boards for decoration or coloring purposes involves unique techniques for feeding printing and affixing the printed image on the glass board for long term lasting on the finished product. The techniques currently known in the art for glass printing are much more complicated, and as a result—also expensive, comparing to printing methods for printing on surfaces of other materials thus often do not fit for printed glass boards in mass production and in acceptable costs. Accordingly, the market of decoratively printed glasses is not a very developed one, and thus in general a plain (i.e. not printed) glass is commonly used for doors, windows or other glass barriers. This is despite of the fact that painted glass could be a source of pleasing decoration and may involve unique effects when combined with either natural or artificial illumination designs, as could be appreciated from sites where such decoration is already in use.

The problems involved in glass printing mainly result from its surface smoothness, its material stiffness and its wet repulsion characteristics which do not allow for impressing it with conventional inks having conventional drying attributes. Accordingly, special ink compositions are used for long lasting glass printing, which commonly include nano particles of glass, wherein the fixation of the printed image is by firing the printed glass in a furnace at high temperatures of 550.degree. C. and more. The exposure of the ink to such high temperature causes the glass micro (or nano) particles to melt, thus affixing the ink pigments into the printed glass surface.

As a result, currently methods for glass printing are mainly based on screen-printing (or silk-printing, both will be referred to hereinafter as "screen-printing") that is the only known method for handling the unique ink compositions that should be used for long lasting printing on flat glass boards.

There are several disadvantages, however, involved in screen-printing of glass boards: difficulties to meet unique customer's requirements (e.g. color, size, shape, small production series etc.) at acceptable prices; long set-up time in shifting from printing one series to the printing of another (because the screen-frame carrying the image should be discharged from the machine and replaced by another); color printing is involved with replacement of the printing frame for each color, or with the use of a series of printer units, each for a different color, with appropriate ink drying/curing stages in between. These and other disadvantages are followed by expensive human labor, equipment and production costs, materials and storage costs (prepared screen-printing frames should be stored after use for a future use of the same application, otherwise should be reproduced for every work order), which places the glass printing market at a low level compared to printing markets of other raw materials.

It is an object of the present invention to disclose an alternative printing method and a printing apparatus that will allow for replacing the traditional screen-printing machinery used in the flat glass printing industry, while solving the above-mentioned disadvantages accompanying screen-printing, and at the same time opening new markets for flat glass printing.

The method and apparatus according to the present invention are inter-alia aimed at the following purposes that are served today by screen-printing:

Automotive—vehicle's windscreens and windows have a narrow painted pattern (a frame) around their upper part, which protects the glue that attaches the window to the car frame from the sun UV radiation and decorates the windscreen;

Architecture—decorative windows for internal and external use.

Home Appliances—windows for microwave ovens, ovens, refrigerators (the invention is not limited to oversized or wide format printing).

In order to achieve the requirements of such printed patterns, which are far different from those of conventional printing (for example, for an automotive windscreens: very high temperature durability, above 550.degree. C., resistance to soaking in warm sulfuric acid and sodium hydroxide solutions etc.), the printed apparatus that should be developed should be capable of functioning with inks that become an integral part of the glass, in an industrial process, which includes heating over 550.degree. C. after the printing, and should have comfortable flexibility in printing either large or small printing series, in replacing the printed image from series to series and in changing colors and in full color printing.

The present invented method and apparatus deal and try to comply with said aims as will become more apparent from the following description.

SUMMARY OF THE INVENTION

The present invention discloses an industrial large format printing apparatus for printing glass based ink on safety flat glass, such as for the automotive OEM (Original Equipment Manufacturer), ARG (Automotive Replacement Glass), Architecture and Appliances markets.

The printing apparatus of the present invention is comprised of the following three basic modules: feeding and positioning module; printing module; and outlet module.

According to a basic semi-automated embodiment of the printing apparatus of the present invention, the feeding and positioning module and the outlet module are one. Actually, they are formed as table, tray, or other horizontal support upon which a user can manually position a glass board (hereinafter will be referred to also as "glass plate") and adjust it for printing, then remove it after printing has completed, and manually feed another glass board in a similar manner.

According to this semi-automated embodiment, the printing automation concerns only the printing itself (i.e. the computerized operation of the printing head and other utility components that may be accompanying it) while the feeding and removal of glass boards are made manually.

According to other and more mechanized semi-automated embodiments of the printing apparatus of the present invention, the feeding and positioning module and/or the outlet module may comprise shifting units which can convey the glass board from an initial upload position to a printing position, or from a printing position to a download position, or a combination thereof (e.g. wherein both systems are included in the apparatus either separately, or as walking beams serving for both uploading and downloading applications). According to these embodiments the glass boards are uploaded and downloaded manually, and the automation is in shifting them to and from the printing position.

Printing apparatuses of various intermediate degrees of automation can be designed as a response to the market requirements, between the basic semi-automated embodiment and between an in-line multi color fully automated printing apparatus, without departing from the scope of the present invention as will be hereinafter described, and further defined by the claims.

As mentioned above, the three modules can be designed either (a) for a completely manual operation of uploading and downloading of glass boards (wherein the feeding and positioning module and the outlet module are one); (b) for a semi-automated sequential printing which allows for feeding the next glass for printing, while the outputting of a just printed one is made simultaneously without a halt by means of a mechanized shifting unit which conveys the just printed board to an outlet position; (c) for in-line fully automated sequential printing; or for any intermediate degree of automation according to market requirements or to the preferences of specific customers.

According to the various embodiments and regardless of their degree of automation is preferably provided with a primary ink fixation assembly (hereinafter will be referred to also as "primary fixation assembly), which allows for safe handling of an outputted glass board from the printer to firing at a high temperature furnace, without risking the integrity of the just printed image. According to the present invention the primary ink fixation assembly is preferably a part of the printing module thus performs the primary fixation simultaneously with the printing such that ink droplets which have just injected from the printing head are immediately being subject to the influence of the primary fixation assembly.

It should be noted that after the primary fixation, the glass boards are transmitted to firing at such high temperatures such as 550.degree. C. and above, for a final fixation of the unique ink, which inter-alia comprises micro particles of glass. Such new and innovative ink for inkjet digital glass printing which is a subject to a patent application by itself, requires however a special ink system that will have the abilities to comply with its unique heterogenic suspension format. Accordingly, the printing module according to the present invention will be further comprising at least a part of the following systems and components, each of which will be further described to its particulars in the detailed description chapter: accurate printing head temperature heating system; ink suspension maintenance system; a special electronic control system for controlling the printing head; a special printing head flushing and/or wiping system; collect trays for demo printing (known in the art as "solid bar printing") or for margin printing.

The digital glass printer according to the present invention further provides for additional important features and applications that cannot be processed through screen-printers. One such application is duplicating the printing area by dividing the printed image to two or more parts, each of which can utilize the full printing area of the printer, while advancing the glass boards in the printer several times during the printing, corresponding to their specific portion to be printed. To that end, the digital glass printer according to the present invention preferably comprises of an accurate linear feeding system (e.g. servo controlled feeding arms—having suction cups for gripping the glass board as will become more apparent from the detailed description of the invention). Furthermore in order to effectively comply with such oversized printing procedure, the printing software of the digital glass printer comprises an appropriate algorithm for dividing the printed image to its parts. Such duplication of printing area cannot be practically processed in screen-printers from several reasons, e.g. a contact between the printing screen and the glass is essentially required in screen-printing, thus printing a second image portion will damage the formerly printed part by smearing, furthermore an accurate positioning of a second part printing is very difficult since the firstly printing screen should be replaced with one adapted to the image of the second part printing wherein the accuracy of positioning of the new screen with respect to the firstly printed image cannot be determined without contacting the screen to the glass surface. The replacement of the printing screen between following image portion is a cumbersome procedure by itself.

Another feature of the digital glass printer that cannot be processed by the traditional screen-printers is capturing the positioning of the fed glass board and digitally adapting the image position to the glass board position. For this purpose the digital printer according to the present invention is provided according to various of its preferred embodiments with at least one CCD camera for glass board position capturing, and with corresponding picture processing algorithm in the printing software capable of glass board position recognition for determining the exact positioning of the fed glass board, wherein another algorithm is used for adapting the printed image to the glass board orientation as determined by the position recognition algorithm. According to other embodiments of the present invention, the glass positioning determination is made by sensor means other than CCD camera, e.g. by laser distance gauge with a corresponding software algorithm. Such electronically processed image adjustment on the glass board to be printed cannot be implemented in the traditional screen-printers currently used for glass board printing wherein the only possible image positioning involves physical adjustment of the screen-screen frame respective to the glass board.

Various embodiments of a printing apparatus for printing on glass boards according to the present invention will be described more particularly in following chapter of this specification.

DETAILED DESCRIPTION OF THE INVENTION

A basic embodiment of the glass printing apparatus for printing flat glass boards with glass based ink (i.e. having glass particles in the ink suspension) according to the present invention, comprises: (a) horizontal support for a glass board to be printed (the horizontal support is preferably comprised of an adjustable roller, or stopper allowing for accurate positioning of the glass board for printing, and may further comprise adjustable pointed protrusions useful for positioning glass boards of non-linear shapes, and clipping or griping means for securing the glass board during printing); (b) at least one digital ink-jet printing head moveable from above the area of a glass board supported by the horizontal support by means of a respective moving mechanism, the printing head is capable of moving above the glass board and injecting glass based ink according to positioning and injecting commands received from a computer or controller; (c) ink supply system in liquid communication with the at least one printing head.

The printing head moving mechanism according to the present invention is comprised of a laterally oriented bridge carrying the printing head, the printing head is moveable along the bridge laterally to the glass board to form X-axis movement, and the laterally oriented bridge is movable perpendicularly to its lateral orientation along two parallel tracks or beams to form Y-axis movement of the printing head. According to various preferred embodiments, the movement of the printing head along the bridge is by means of linear motor, and the movement of the bridge along the beams is by means of ball-screw mechanism (hereinafter will be referred to also as 'screw drive mechanism'), wherein a rod having helical thread extends along a longitudinal inner space of each of the beams and wherein a simultaneous synchronous rotation of the rods at the two beams drive two corresponding nuts (will be referred to hereinafter also as 'riders') having inner threading (and preferably having bearings for friction reduction) complementary to and matching the helical threading of the rods. The two opposite sides of the bridge are joined respectively to the riders, and thus the synchronous rotation of the rods shifts the bridge along the beams.

Preferably, the printing apparatus of the present invention, to its various embodiments, includes a primary ink fixation system. The primary ink fixation system is comprised of at least one longitudinal heater located parallel to the bridge. According to one preferred embodiment at least one heater is connected in parallel to the bridge in such a position such that it advances along the glass board before the printing head, and thus it heats lateral strip-like portions of the glass board prior to being printed, resulting in fast drying of the ink droplets which contact the so heated glass surface. According to another embodiment at least one heater is located in parallel to the bridge in such a position such that it advances along the glass board after the printing head, and thus it heats lateral strip-like portions of the glass board after being printed, resulting in fast drying of the ink droplets which are heated by the heater from above. According to another embodiment at least two heaters are located parallel to the bridge in such a position such that at least one of the heaters advances along the glass board before the printing head, and thus it heats lateral strip-like portions of the glass board prior to being printed, resulting in fast drying of the ink droplets which contact the so heated glass surface, while the other heater is located in parallel to the bridge in such a position such that it advances along the glass board after the printing head, and thus it heats lateral strip-like portions of the glass board after being printed, resulting in fast drying of the ink droplets from both upper and lower directions.

According to further embodiments of the present invention the primary ink fixation system is comprised of at least one longitudinal heater located parallel to the bridge and from at least one spot heater unit located near at least one printing head and moves together with the printing head along the bridge. According to one variation both longitudinal and spot heater units are designed to heat the glass surface closely prior to the printing. According to another variation both are designed to heat the glass surface closely after printing. According to yet another variation at least one heater unit is located as to heat the glass surface prior to printing while at least one other heater is designed to print the glass surface after printing.

According to further embodiments the printing direction could be switched. Accordingly, the same heater which heats the glass surface prior to printing in a first printing direction may heat the glass surface after printing in case the printing direction has switched.

According to various preferred embodiments the printing apparatus of the present invention comprises in addition to the longitudinal heaters ventilation means, for dispersal of the vapors and gasses released from the ink after printing and during the primary fixation process. Such vapors and gasses increase the wetness of the air near the printing, and thus delay the ink dying. In addition they may block certain amounts of the IR radiation emitted from the heaters from reaching at the glass surface. Accordingly, they should preferably be dispersed. The ventilation means for dispersing the vapors and gasses fog may comprise a fan or a line of fans suspended from below the bridge, or may comprise a plurality of air blowing channels directed towards the printing area and fed by an air flow supplied by a common air blower.

It is possible according to the present invention to print with UV curable ink as well. Accordingly, in various embodiments of the printing apparatus of the present invention the primary ink fixation system comprises at least one ultraviolet lamp for UV ink curing. At least one UV lamp is arranged so as it moves in full correlation with the movement of the printing head, for immediate irradiation of the printing. In case the printing head is designed to print bi-directionally along the X-axis of printing, two UV lamps are provided, each on an opposite side of the printing head, to allow UV irradiation on the printing regardless of the printing direction (the two lamps can be activated alternately, however, according to the actual printing direction).

Preferably, the printing apparatus of the present invention, to its various embodiments, includes in its ink supply system means for maintaining an ink having solid micro particles to reach at least one printing head in a substantially unified heterogenic suspension, i.e. a suspension having a substantial uniformity in the dispersal of its different phase ingredients, including liquids and solid nano particles, in any region of its volume.

Preferably, the printing apparatus of the present invention, to its various embodiments comprises also a printing head temperature controlling system, for maintaining the printing head in a temperature adapted to manufacturer specifications of the ink to be used. Such temperature controlling system is typically comprised of a heating element for heating the printing head, and of a thermostat, or of a heat sensor communicating with a computerized controlling means adapted to calculate the heating element activation time or electrical current, according to a feedback from the heat sensor and according to the amount of ink to be consumed by the printing head in real time (which could be calculated according to data relating to the currently printed image).

Preferably, the printing apparatus of the present invention, to its various embodiments, is further comprising printing head wiping or flushing system. The flushing system is typically comprised from a solvent reservoir in liquid communication with at least one printing head, and from a pump, a pressurized air system, or other effective means for delivering the solvent. In case of a long term postponement of the printing (e.g. during non working night hours) or in other cases requiring flushing of the printing head (e.g. ink type or color replacement), the solvent is directed into the printing head for flushing, preferably through appropriate filter to remove unwanted sediments. If the printing head is comprised of an array of a plurality of basic printing heads, the flushing reservoir may communicate with all through an appropriate manifold.

The wiping system is comprised of a wiper (typically a rubber strip held in a gripper), wiper supporter upon which the wiper is positioned to face the bottom of a printing head to be wiped), means for bringing the wiper to a contact with the printing head bottom and for moving it laterally for wiping off and removing ink or solvent remaining According to one variation the wiper is held constantly near the end of the bridge, and the printing head is moved over the wiper through an appropriate controller command activated at the end of flushing procedure or initiated by the printer operator. According to another variation the wiper supporter has means for movement along the bridge, and if so required (e.g. according to a specific form of the printing head bottom) has also means for up and down movement, which allows for driving the wiper supporter below the printing head, moving it up to a contact with the printing head bottom (if required), then shifting the wiper (or the printing head) laterally for wiping and removing ink or solvent remaining.

Additional systems and assemblies may be incorporated into the various embodiments of a glass printing apparatus of the present invention, to improve its performances, to improve its automation facilities, or to facilitate user control and activation procedures.

Accordingly, the printing apparatus of the present invention may further comprise at least one demo pre-printing or margin printing collect tray. A demo printing could sometimes be necessary (e.g. after a postponement of the printing for a time period that may cause partial drying of ink at the ink jet apertures, or e.g. for initial acceleration of the printing head until it reaches a substantially constant velocity and normal ink flow) in order to obtain perfect homogeneous printing. Margin printing is often required when a glass board should be printed adjacent to its margins. In order to allow for such demo printing or margin printing instantly, collect trays may be provided at the sides of the printing position, and the demo printing or the margin printing could be performed on these trays.

To improve automation, the apparatus may further comprise of a glass board outlet convey module for removing printed glass boards from the horizontal support to an outlet position, and/or a glass board feeding convey module for conveying glass boards from an inlet position to the horizontal support. The feeding convey module and the outlet convey module may be synchronized such that when a first glass board is removed by the outlet convey module after printing, the next glass board is brought simultaneously by the feeding convey module to a printing position on the horizontal support.

According to various embodiments of the printing apparatus, it is further comprising a mechanism for elevating and lowering the printing head respective to the glass board to be printed or for elevating and lowering the glass board to be printed, respective to the printing head (this mechanism may be a part of the glass board feeding module and/or of the glass board outlet module, both of which can have glass griping arms having a convey movement in the glass board flow direction (e.g. by means of servo mechanism), and further having up and down movement (e.g. by means of pneumatic piston mechanism).

For the purpose of a more detailed description of the invention, and in no manner to limit its scope to any specific embodiment, one embodiment was selected to be hereinafter described in details. According to this embodiment the glass printing apparatus is comprising (a) glass board feeder unit for feeding and supporting glass boards underneath a digital ink jet printing head; (b) at least one digital ink jet printing head in communication with a computerized controlling arrangement and capable of injecting glass based ink and of moving respective to a glass board to be printed; (c) ink supply system in liquid communication with the at least one printing head; (d) glass board outlet system for removing printed glass boards from underneath the printing head and supporting them until removed from the printer; (e) at least one of the following components (e1) means for maintaining an ink having solid nano particles to reach at least one printing head in a substantially unified heterogenic suspension; (e2) primary ink fixation system; (e3) glass board location capturing system; (e4) at least one collect tray for receiving ink during demo or margin printing; (e5) printing head temperature controlling system; (e6) printing head wiping or flushing system.

The apparatus may further comprise an automation control system for controlling and synchronizing the operation of the apparatus for a semi-automated or for fully automated sequential printing of glass boards.

According to other variations the fully automated apparatus may be incorporated into a production line as an in-line device. For this purpose it is provided with an automation control system for controlling and synchronizing the operation of the apparatus as an in-line fully automated printer in a production line, through communication with a central controlling system of such production line.

According to various preferred embodiments of the printing apparatus, the glass board horizontal support comprises a table made of horizontally oriented spaced bars each having a top surface with upwardly oriented tips, altogether forming an array of upwardly oriented tips upon which a flat glass board can be positioned and supported. The tips could be made from any rigid and smooth material, e.g. metal, coated metal, plastic, Teflon or other material or combination of materials having similar properties.

According to a first variation of the printing apparatus, the glass board location capturing system comprises at least one CCD camera and a computer algorithm for image interpretation of glass board images obtained by at least one CCD camera and for determining glass board location accordingly.

According to another variation of the printing apparatus the glass board location capturing system comprises at least one laser distance gauge and computer algorithm for interpreting and determining of glass board location according to data provided by the laser distance gauge.

The present invention further relates to a method for printing flat glass boards with glass based ink, comprising; (a) providing a computer memory with image to be printed; (b) positioning a glass plate to be printed underneath at least one digital ink jet printing head capable of receiving from the computer and accordingly executing ink jetting commands and positioning commands; (c) providing at least one printing head with jetting and positioning commands corresponding to the image to be printed; (d) supplying to the printing head glass based ink in a substantially unified heterogenic suspension in quantities sufficient for printing the image; (e) drying or curing the image until a primary fixation is achieved sufficient for safely conveying the printed glass plate to completing the ink fixation in a furnace.

Said method may further comprise steps for step printing of oversized glass boards, the steps includes (f) activating computer algorithm for dividing the image to be printed to printable sub sections; (g) positioning the glass board in an initial printing position and printing a first printable sub section on the glass board; (h) shifting the glass board to a second printing position and printing a printable sub section corresponding to the second printing position; (i) repeating step 'h' until all the sub sections are printed.

DETAILED DESCRIPTION OF THE FIGURES

Figure 1:
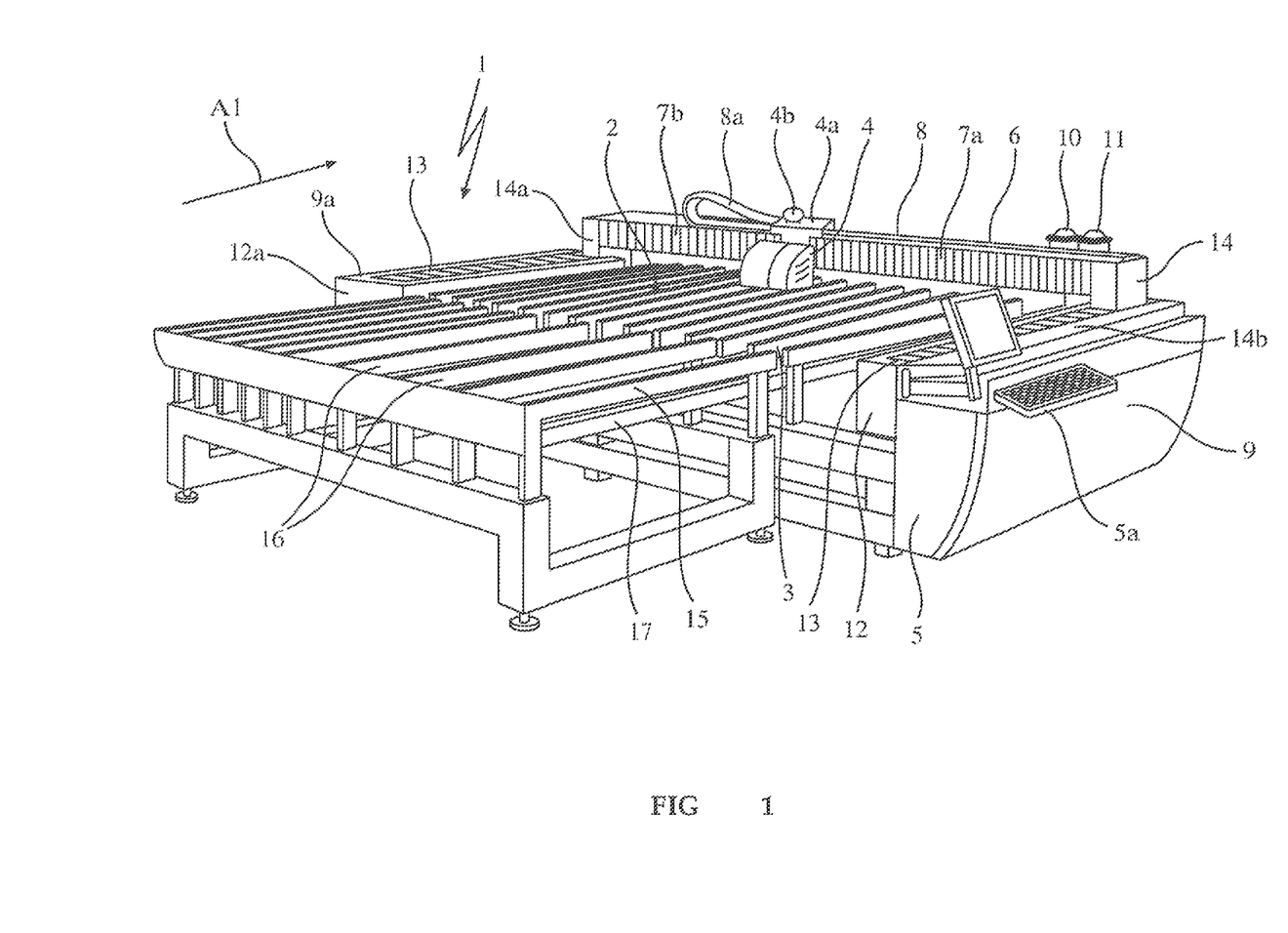
FIG. 1 illustrates in an isometric view a selected embodiment of the digital ink jet printer of the present invention.

FIG. 1 illustrates in an isometric view of a selected embodiment of the digital ink jet printer (1) of the present invention. The illustrated printer comprises a horizontal support (2) made of a plurality of spaced bars (3), upon which can be positioned a glass board (not illustrated) underneath a digital ink jet printing head unit (4). This specific printing head unit is internally constructed from an array of eight basic printing heads arranged in two rows of four. For example, Spectra Nova 256 printing head could be used as a basic printing head. This Model of printing head comprises four electrically independent piezoelectric sections, each of the four having a jet command line and 64 channels (ink jetorifices), each channel has a separate digital address for obtaining from a computer (having the image data) a "0" or a "1" as a jetting instruction for the currently printed dot. The eight basic printing heads of the array are loaded with the specific jetting instruction of each orifice according to the data of a specific image region to be currently printed by the 8.times.4.times.64 orifices, as supplied by the system computer (5) (or by alternative external computer). Thereafter, upon receipt of a jet command through the jet command line, each of the orifices instructed to print a dot injects an ink droplet. The speed of the droplet could be tuned by controlling the voltage amplitude of the pulse supplied to the jet command line, and the droplet volume can be tuned by controlling the pulse width.

The printing head unit (4) is moveable along a bridge (6) laterally to the glass board feeding direction A1 to form X-axis movement. The bridge is formed from a hollow bar of a rectangular cross section view. The laterally oriented bridge is movable perpendicularly to its lateral orientation along two parallel tracks or beams to form Y-axis movement of the printing head, the movement of the printing head unit (4) along the bridge (6) is by means of linear motor comprised of a coil member connected to the backside of the printing head unit (4) and of magnets fixed along the length of one the side walls of the bridge (6). The linear motor magnets and longitudinal space are covered by flexible folding wall parts (7a) and (7b) which the coil member of the linear motor pass in between to run along the magnets. When the printing head moves to the left the wall part (7b) is shrunk by the coil member which protrudes from the printing head backside, while the wall part (7a) is expanding. The opposite happens when the printing head moves to the right. The printing head (4) communicates with the other printer parts (i.e. ink supply, solvent supply, electric and electronic systems) through cable strip (8) which is foldably extended through the loop (8a) between the print head interface housing (4a) on its one end and the printer system cabin (9) on its next end. The ink tank (10) and the solvent tank are connected to the bridge (6) according to the present embodiment, however, according to other embodiments are located inside the printer system cabin (9) or the printer system cabin (9a) on the other side of the printer. In addition to its X-axis (along the bridge) and Y-axis (by the bridge) motions, the printing head unit is moveable also in the Z-axis by means of servo motor located inside the cylindrical housing (4b). Thus the printing head unit could be adjusted to an optimal printing height from above the glass surface to be printed. The height of the printing head unit (4) above the glass surface could be adjusted automatically by means of a laser distant gauge which provides the printer computer (5) with height data, wherein in return the computer adjusts the printing head unit (4) height to an optimal predetermined height which has be recognized in advance as resulting with optimal printing. Accordingly, the height of the printing head unit from above the glass surface may be kept unchanged, regardless of the thickness of the glass board to be printed. According to other embodiments of the present invention the printing head may provided also with controllable pivot movement about its vertical axis, useful for tracing and printing in curved lines.

The laterally oriented bridge (6) is movable perpendicularly to its lateral orientation along two parallel beams (12) and (12a) to form Y-axis movement of the printing head unit (4). According to the present embodiment the movement of the bridge (6) along the beams (12) and (12a) is by means of screw drive mechanism, wherein a rod having helical thread extends along a longitudinal inner space of each of the beams (12) and (12a) and wherein a simultaneous synchronous rotation of the rods at the two beams (12) and (12a) drives two riders (nuts) having inner helical threading (and preferably having bearings for friction reduction) complementary to and matching the helical threading of the rods. The two opposite side posts (14) and (14a) of the bridge (6) are joined respectively to the riders inside the inner space of the beams (12) and (12a), and thus the synchronous rotation of the rods shifts the bridge (6) along the beams. In order to protect the screw drive systems and the bridge from unwanted strain and pressure forces that may occur in case of differentiation in the rotation starting moment between the two helical threading rods (which in turn may result in diagonal deviation of the bridge from its normal lateral orientation), the bridge may be joined to the nut riders of the ball screw through a pivotable post on its one end, and through a pivotable sliding track on its other end, such that in case of diagonal deviation of the bridge from its neutral lateral orientation, the bridge can pivot on its one end on the pivotable post, and slide and pivot on its other end on the pivotable sliding track, for compensating against its asynchronous advancing along the two screw drives. Accordingly, the bridge post (14a) of the present embodiment is pivotable, and the bridge is connected to its other post (14) through a pivotable sliding track (14b)

The beams are covered from their five directions by metal panels, while the sixth (upper) direction is covered by an accordion-like folding cover (13) and (13a), respectively, which allows for movement of the bridge side posts (14) and (14a) along the beams (12) and (12a) while the accordion-like folding covers (13) and (13a) shrink or expand according to the position of the posts (14) and (14a) respective to the beams. A printing sequence in the illustrated printed starts by placing a glass board on the feeding table (15), which similarly to the horizontal support (2) is also made of a plurality of spaced bars (16). Each bar (16) has on its top several spherical bearings spaced from one another and protruding upwardly, such that when a glass board is placed on the feeding table (15) it can easily be shifted earned on the bearings, to an appropriate alignment position. Rulers or stoppers may be applied at predetermined positions on the bars, either parallel or transversely to the longitudinal directions of the bars, as marginal limits to a glass board to be printed. After the glass board is placed, the printer operator instructs the printer through the printer computer terminal (5a) or by pressing a pedal (not illustrated), to grip the board firmly on the feeding table, which is preformed by means of upwardly oriented suction cups which are then vacuumed to firmly grip the glass board from below, and stress it against the bars to prevent undesired movement. At least two walking beams (17) are placed between the table spaced bars (16). The walking beams has also upwardly oriented suction cups for capturing and gripping a glass board. Upon printer operator instruction (either through the computer terminal, or by secondly pressing the pedal) the walking beams are lifted slightly by means of pneumatic pistons to contact the lower surface of the glass board with their suction cup, then grip it firmly when the suction cups are vacuumed. After capturing of the glass board by the walking beams, the vacuum in the suction cups of the feeding table is released, and thereafter the walking beams are further lifted by the pneumatic pistons to elevate the glass print slightly above the spaced bars level, then a servo system pulls the walking beams laterally between the spaced bars of the feeding table and of the horizontal surface, with the glass board gripped from above by their suction cups, until the glass board is brought exactly above its printing position, and the lateral movement of the walking beams is stopped. The glass board is now lowered by the pneumatic pistons slightly lowering the walking beams, such that the lower surface of the glass board contacts an array of upwardly oriented tips protruding from the upper end of the spaced bars (3) of the horizontal surface (2). The tips could be produced from any smooth rigid material, such as metal, coated metal, plastic or Teflon, or the like. After the glass board is captured and gripped by upwardly oriented suction cups located between the spaced bars (3) of the horizontal surface, the vacuum is released from the suction cups of the walking beams (15) which could then are further lowered slightly by the pneumatic pistons. A next glass board can now be placed on the feeding table in a similar manner as the first one, while the first one is being printed with the appropriate image as instructed by the system computer (5) or by any external computer in communication with the printing head unit (4). After completing the printing, the walking beams which meanwhile have been returned by the servo to face the bottom surface of the next glass boards, are elevated by the pneumatic piston for capturing the next glass board similarly to the capturing of the first, now printed, glass board, with the difference that now the walking beams capture simultaneously the first, now printed, glass board, at its printing position on the horizontal support. After both glass boards been captured by the walking beams suction cups, the suction cups of the feeding table and of the horizontal support are released, and then both glass plates are slightly elevated above the spaced bars (16) and (3), respectively, by the pneumatic pistons which elevate the walking beams, and while the servo controlled lateral movement of the walking beams brings the next glass board exactly above its printing position, the first, now printed, glass board reaches an outlet position above an outlet table (not illustrated) which can be designed similarly to the feeding table (15), or can be a conveyor belt or any other support which can receive printed glass board and hold them until removal. A third glass board can be meanwhile loaded to the feeding table (15), while the second glass board is lowered to contact the horizontal support and while simultaneously the first glass board is lowered to contact the outlet table or conveyor. Thus, in a sequential printing process, three glass boards are treated simultaneously on the illustrated printer embodiment, one of which—in a printing position, one in the feeding table, and one in the outlet module.

Figure 2:
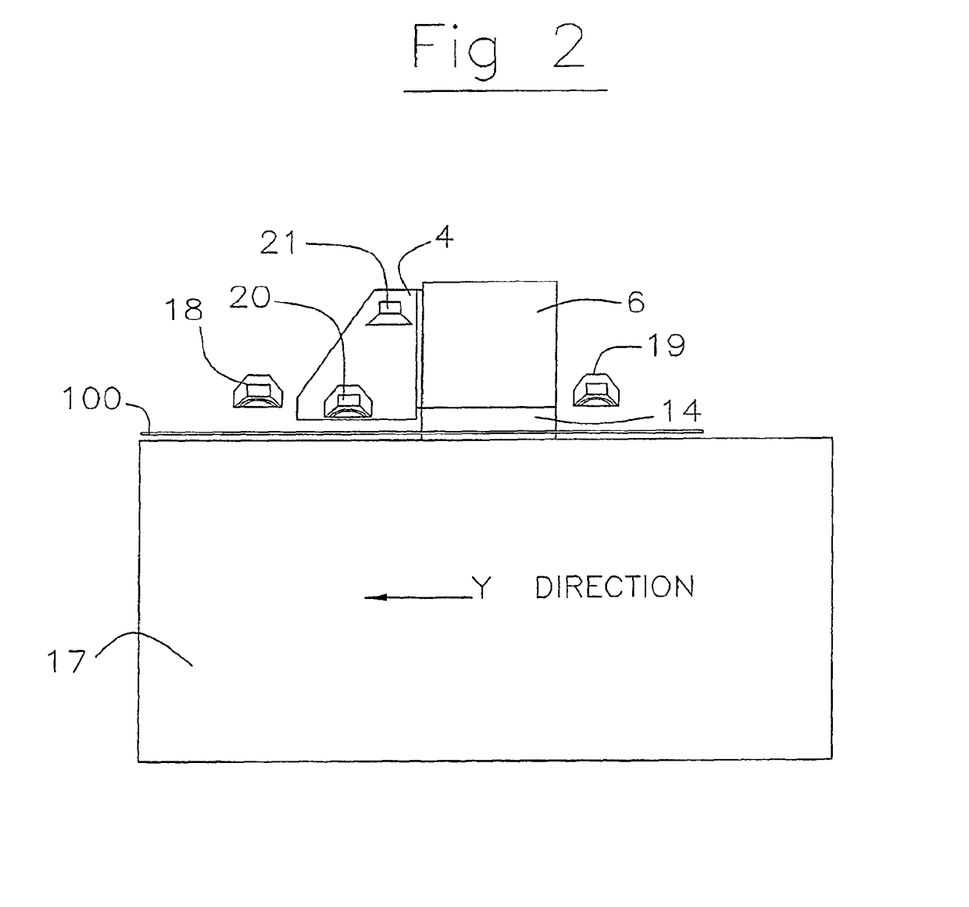
FIG. 2 illustrates a side view of the heaters of the primary ink fixation system according to a selected embodiment of the printer of the present invention.

FIG. 2 illustrates a side view of the heaters (18), (19) and (20) of the primary ink fixation system according to a selected embodiment of the printer of the present invention. The primary ink fixation system allows for drying the ink liquid vehicle, which terminates its duty immediately after the injected ink droplets reach their destination on the glass board. The evaporation of the ink liquid vehicle for a primary fixation of the printed image on the glass surface is essential for further handling the glass board along a production line without risking the image integrity e.g. as a result of smearing wet ink by unintentional touch, or as a result of wet ink leaking while changing the orientation of a printed glass board from horizontal to a vertical orientation. Contrarily to digital inkjet printing on other materials, in security glass printing this drying procedure does not become final because the glass board should still be fired in at least 550.degree. C. furnace for final fixation of the image by melting the glass nano-particles of the glass based ink using for such printing. Therefore, the drying process according to the present invention is referred to as "primary fixation". A basic primary ink fixation system is comprised of at least one longitudinal heater (18) or (19) located parallel to the bridge (6). According to one basic embodiment at least one heater is the rear heater (19) which is connected parallel to the bridge (6) in such a position that it advances along the glass board before the printing head (4), and thus it heats lateral strip-like portions of the glass board prior to being printed, resulting in fast drying of the ink droplets which contact the so heated glass surface. According to another basic embodiment at least one heater is the front heater (18) that is located parallel to the bridge (6) in such a position such that it advances along the glass board after the printing head (4), and thus it heats lateral strip-like portions of the glass board after being printed, resulting in fast drying of the ink droplets resting already on the glass surface which are thus being heated by the front heater (18) from above. According to a third basic embodiment at least the two heaters (18) and (19) are located parallel to the bridge (6) in such a position that at least one of the heaters advances along the glass board before the printing head, and thus it heats lateral strip-like portions of the glass board prior to being printed, resulting in fast drying of the ink droplets which contact the so heated glass surface, while the other heater is located in parallel to the bridge in such a position such that it advances along the glass board after the printing head, and thus it heats lateral strip-like portions of the glass board after being printed, resulting in fast drying of the ink droplets from both upper and lower directions. According to this third embodiment the printing direction along the Y-axis could be inverted with no significant affect on the drying process which according to this embodiment comprises both pre-print heating and post-print heating, regardless of the printing direction.

According to further embodiments of the present invention the primary ink fixation system is comprised of at least one longitudinal heater (18) or (19) located parallel to the bridge (6), and from at least one spot heater unit (20) located near the at least one printing head unit (4) and moveable together with the printing head unit (4) along the bridge. According to one variation both longitudinal (18) or (19) and spot heater (20) units are designed to heat the glass surface closely prior to the printing. According to another variation both (18) or (19) and (20) are designed to heat the glass surface closely after printing. According to yet another variation at least one heater unit (18) or (19) or (20) is located as to heat the glass surface prior to printing while at least one other heater (18) (or (19) or (20) is designed to print the glass surface after printing. According to further embodiments the printing direction could be switched. Accordingly, the same heater which heats the glass surface prior to the printing in a first printing direction may become heating the glass surface after the printing in case the printing direction has switched.

It is possible according to the present invention to print with UV curable ink as well. Accordingly, in various embodiments of the printing apparatus of the present invention the primary ink fixation system comprises at least one ultraviolet lamp (21) for UV ink curing.

The heater units (18) and (19) may be connected directly to the bridge (6), or through side posts directly to the screw drive inside the side beams. The heater unit (20) and the UV lamp (21) may be connected directly to the printing head unit (4) or to an arm such as the one through which the printing head unit is connected to the linear motor inside the bridge space.

Figure 3:
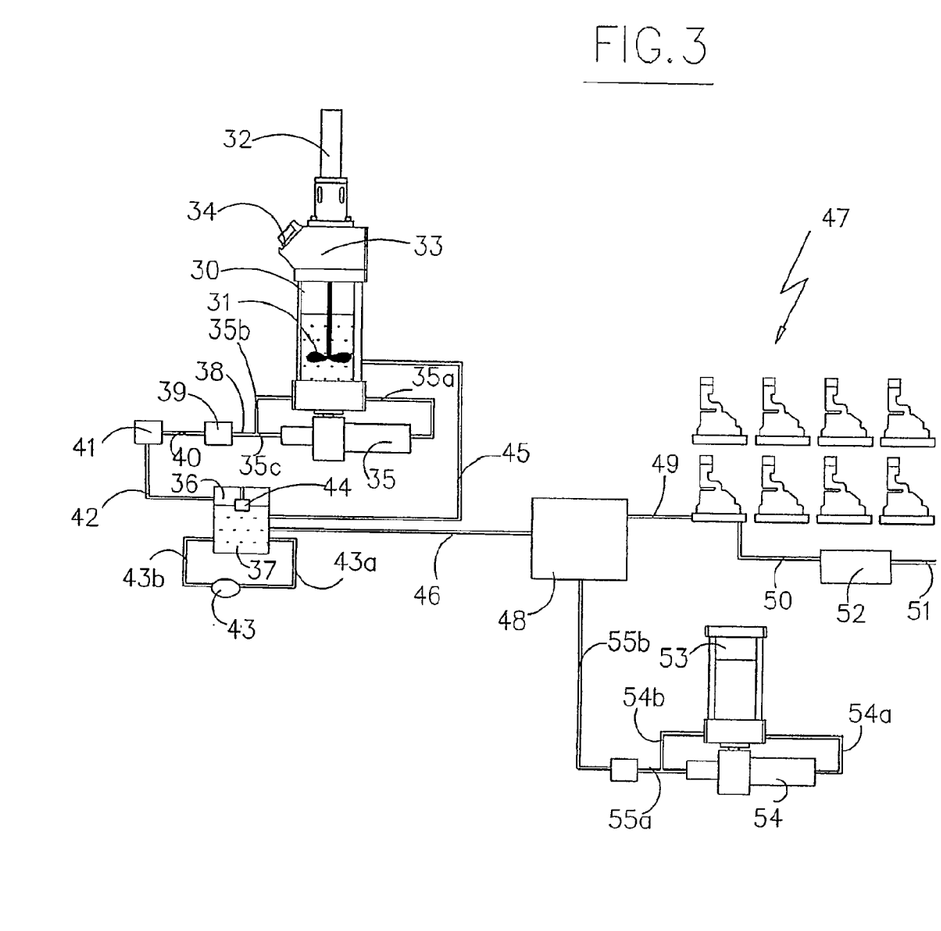
FIG. 3 illustrates a selected embodiment of the ink supply system and the flushing system of a digital ink jet glass printer according to the present invention.

FIG. 3 illustrates a selected embodiment of the ink supply system and the flushing system of a digital ink jet glass printer according to the present invention. According to the present embodiment the ink supply system is comprised of a main ink tank (30) having a stirrer (31) driven by electrical motor (32) fixed to the cap unit (33) of the main ink tank Ink could be added to the main ink tank through lid (34) located on the cap unit (33). The ink in the main ink tank is circulated through a circulation line comprising the inlet and outlet circulation pipes (35 a) and (35b) that are connected to the main tank circulation pump (35). The ink supply system is further comprising a mid ink tank (36) which receives its ink content (37) from the main ink tank (30). According to the illustrated embodiment the main ink tank (30) is supplying its ink to the mid ink tank (36) through a junction (35c) in the circulation pipe (35b), and further through pipe (38), 5 micron fiber-made ink filter (39), pipe (40), 14 micron steel made secondary filter (41), and pipe (42). The 14 micron filter (41) is located past the 5 micron filter (39) in order to block fibers that may be torn released from the 5 micron fiber-made filter (39) during time. The 5 micron filter (39) is aimed to filter the ink from particles that may damage the effective operation of the printing head. The ink content (37) of the mid ink tank (36) is also circulated, through the circulation line comprising the inlet and outlet pipe segments (43a) and (43b) and the mid ink tank circulation pump (43). The ink tank (36) is further comprising a float (44) which is aimed to maintain the ink content (37) in a substantially fixed level, by means of a valve (not illustrated) which opens the re-circulation pipeline (45) to the flow of ink from the mid ink tank (36) back to the main ink tank (30). The ink flow from the main ink tank to the mid ink tank (36) and back to the main ink tank (30) is generated by the main ink tank circulation pump (35) which is capable of forcing the ink flow through both the main ink tank circulation line (i.e. through pipes (35a) and (35b)) and the ink supply path comprising the pipes (38), (40), (42), and the filters (39)(41), and back to main ink tank (30) via the recirculation pipeline (45). The mid ink tank (36) is thus capable of supplying unified heterogenic ink solution to the printing head unit. This is done through ink supply pipe (46) which is in liquid communication with the array of the eight printing heads (47) through eight channel manifold switching valve unit (48) and through eight printing head input pipes (49) (only one of the eight pipes (49) is illustrated in this figure, the other seven are connected respectively to the other seven printing heads of the array). The printing head unit returns surplus ink volumes back to the main ink tank through eight pipes (50) (only one of the eight pipes (50) is illustrated in this figure, the other seven are connected respectively to the other seven printing heads of the array) and through the ink filter (52) and the pipe (51), thus forming another ink circulation path.

The printing head flushing system is comprised of the solvent tank (53), solvent pump (54), solvent by-pass inlet and outlet pipes (54a) and (54b), solvent supply line (55a) (55b) and 5 micron filter (56). When the need arises to flush the printing heads, the flush pump (54) is activated and the valve of the eight channel manifold switching valve (48) is switched to block the ink flow from the ink supply line (461) and to let the solvent flowing from the solvent supply line (55b) to the printing heads, which are thus being flushed by a solvent being injected through the plurality of injection orifices of the printing head unit. In case the switching valve (48) blocks the solvent supply line (55b) and the pump (54) still forms pressure, it is released through the by pass line formed by pipes (54a) and (54b).

Figure 4:
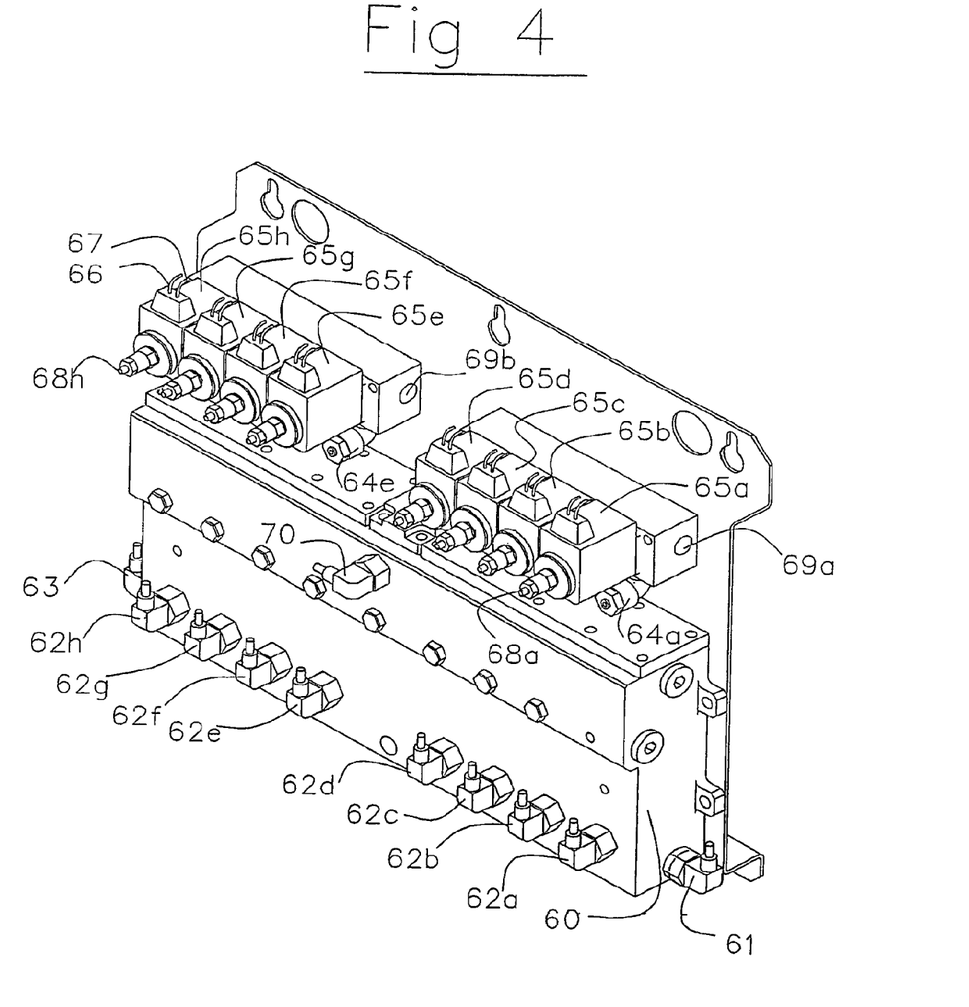
FIG. 4 illustrates an isometric view of a selected embodiment of an actual mid ink tank of an ink supply system according to a selected embodiment.

FIG. 4 illustrates an isometric view of a selected embodiment of an actual unit comprising mid ink tank, eight channel manifold and switching valves, of an ink supply system according to a selected embodiment. The mid ink tank according to the illustrated embodiment is comprised of an ink container (60) having circulation line inlet (61) and circulation line outlet (63), and an eight outlets hub comprising the outlets (62a) to (62h). The eight outlets (62a) to (62h) are to be connected respectively to ink inlets (64a) to (64h) (only two of which—(64a) and (64e) are visible in the illustrated perspective view) of eight switching valves (65a) to (65h) each of which is controllable through a pair of electrical wires (65) and (67) to select between a state wherein the valve outlets (68a) are (68h) is in liquid communication with the respective ink inlets (64a) to (64h) and between a state wherein the valve outlets (68a) to (68h) are in liquid communication with the respective solvent inlet (69a) which cooperates with the valves (65e) to (65h), or (69b) which cooperates with the valves (65a) to (65d). The valves outlets (68a) to (68h) are connected respectively to eight printing head of a printing head array unit (not illustrated). The ink container (60) receives its ink through central ink inlet (70), and it further has a float inside (hidden in this figure) which controls the ink flow through the container (60) to maintain a substantially fixed ink level inside.

Figure 5:
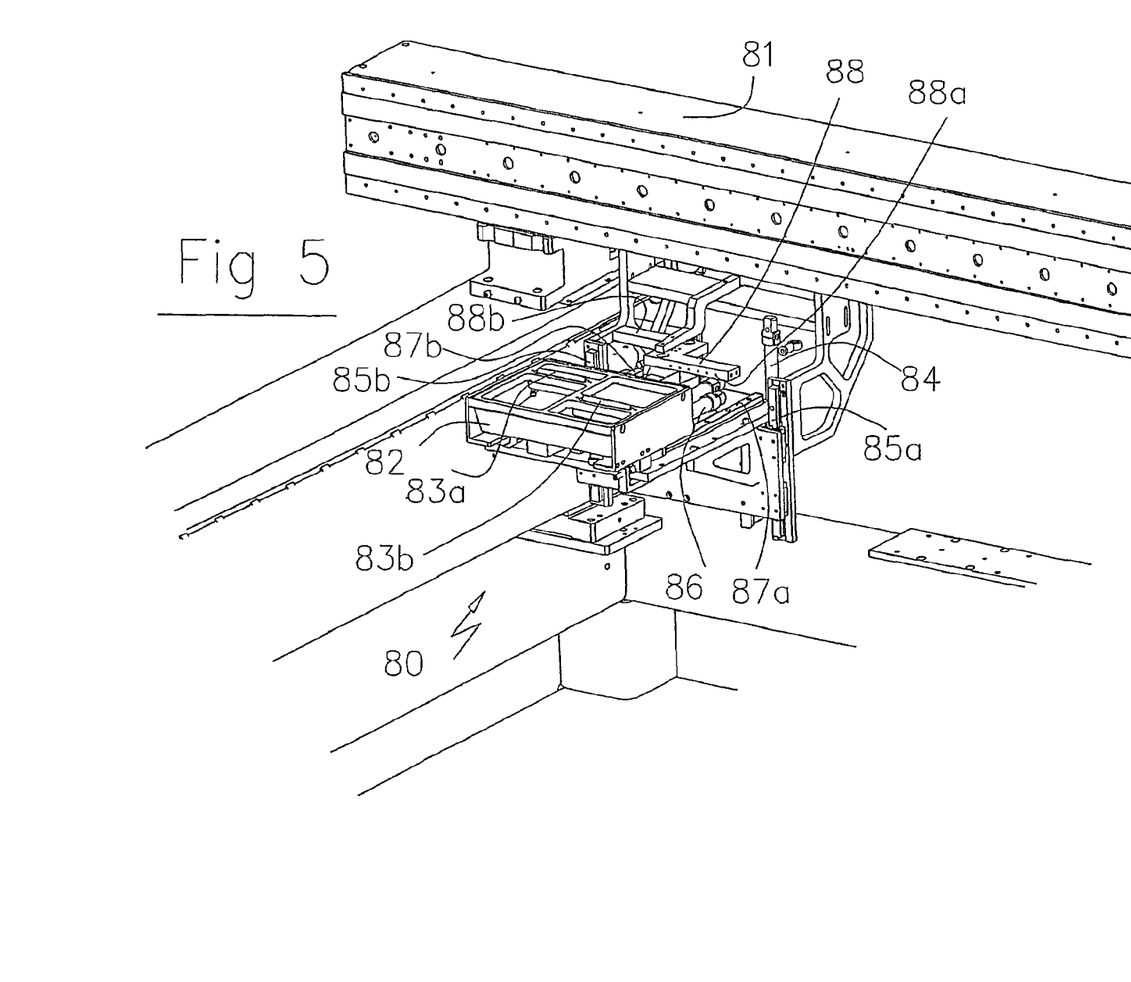
FIG. 5 illustrates an isometric view of a printing head wiping assembly according to a selected embodiment.

FIG. 5 illustrates an isometric view of a printing head wiping assembly according to a selected embodiment. The wiping assembly (80) is connected near one end of the bridge (81) such that the printing head (not illustrated in this figure) could be brought to a wiping position from above the wiping assembly (80). The wiping assembly comprises a bath tube (82) with two upwardly oriented wipers (83a) and (83b). The bath tube (82) is for receiving flushing solvent injected through the plurality of injection orifices of the printing head during a flushing procedure. At the end of the flushing procedure, the orifices may still have solvent and ink remaining. These should be wiped off. The wiping is executed in two main motions. The first motion is performed by the vertical pneumatic piston (84) which elevates the bath tube (82) along the vertical sliding tracks (85 *a*) and (85*b*) such that the wipers (83*a*) and (83*b*) contact the bottom of the printing heads array. The second motion is performed by the horizontal pneumatic piston (86) which slides the bath tube (82) along the horizontal sliding tracks (87*a*) and (87*b*) such that the wipers (83*a*) and (83*b*) move over the printing heads injection orifices, thus wiping the remaining solvent and ink droplets suspended from the bottom of the printing heads array. Thereafter the vertical piston may lower the bath tube (82). The wiping assembly further comprises self flushing device (88) having a plurality of apertures (88*b*) (which cannot be observed in the illustrated perspective since they face the opposite side of the self flushing device (88)) and (88*a*), through which solvent may flow upon activation, to flush the wipers (83*a*) and (83*b*). before such activation, the bath tube (82) with the wipers is brought by the horizontal pneumatic piston (86) to a position underneath the self flushing device (88), then elevated by the vertical piston (84) such that the aperture groups (88*a*) and (88*b*) are exactly facing the wipers (83*a*) and (83*b*), respectively, thus flushing the wipers with jets of solvent.

Figure 6:
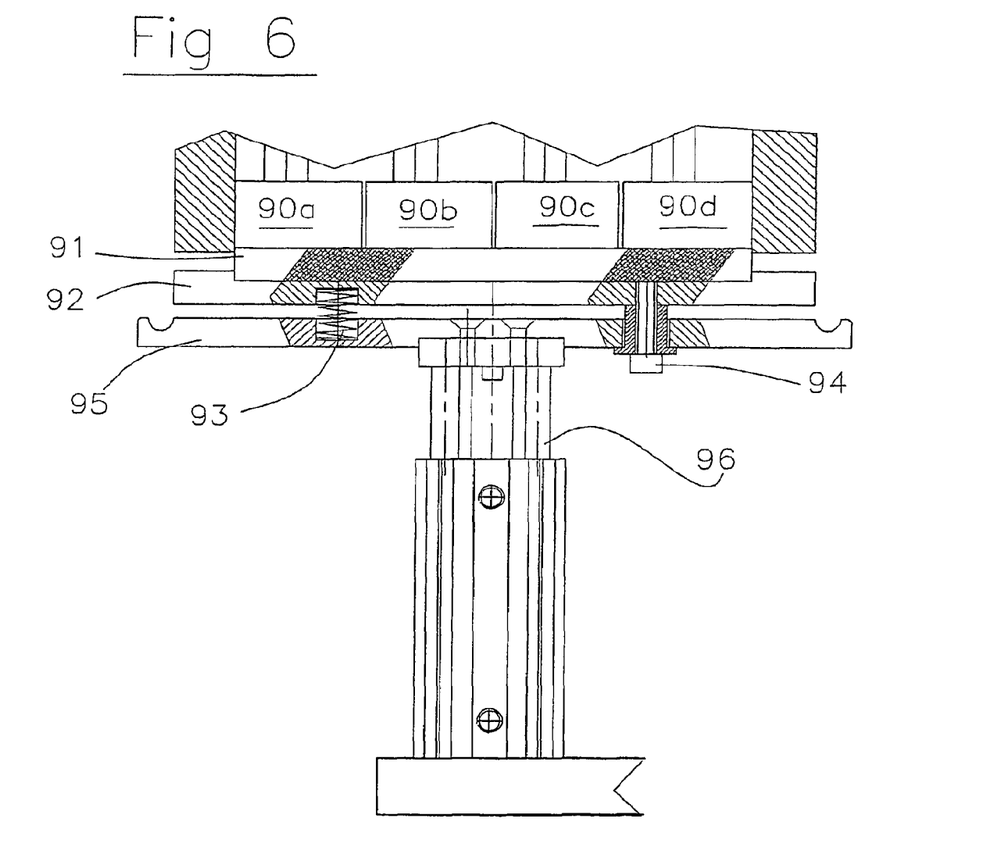
FIG. 6 illustrates a side view with partial cross sectional view of a printing head capping assembly according to a selected embodiment of the present invention.

FIG. 6 illustrates a side view with partial cross sectional view of a printing head capping assembly according to a selected embodiment of the present invention. Four printing heads (90*a*) to (90*d*) are illustrated in a vertical cross sectional view. Each of the printing heads has at its bottom a plurality of ink injecting orifices (not illustrated in this figure) which preferably should be capped whenever the printer is not in use (i.e. during night hours) in order to prevent drying of ink sediments inside the printing heads. The capping is made by a resilient and liquid opaque pad (91) which is supported by a rigid plate (92) connected through adjusting springs (93) (only one of which can be observed in the illustrated cross section view) and through bolts (94) (only one of which can be observed in the illustrated cross section view) to a base plate (95) which is connected to the top end of a vertically oriented piston. When capping of the printing head is required, the printing head is brought to a position above the capping assembly, and the piston is elevated such that the capping pad (91) is pressed against the bottom of the printing heads (90*a*) to (90*d*) thus capping their injection orifices in an appropriate force as regulated by the springs (93). The pad (91) is made of a resilient material which allows for an enhanced contact of the pad surface with the bottom surface of the printing heads.

Figure 7:
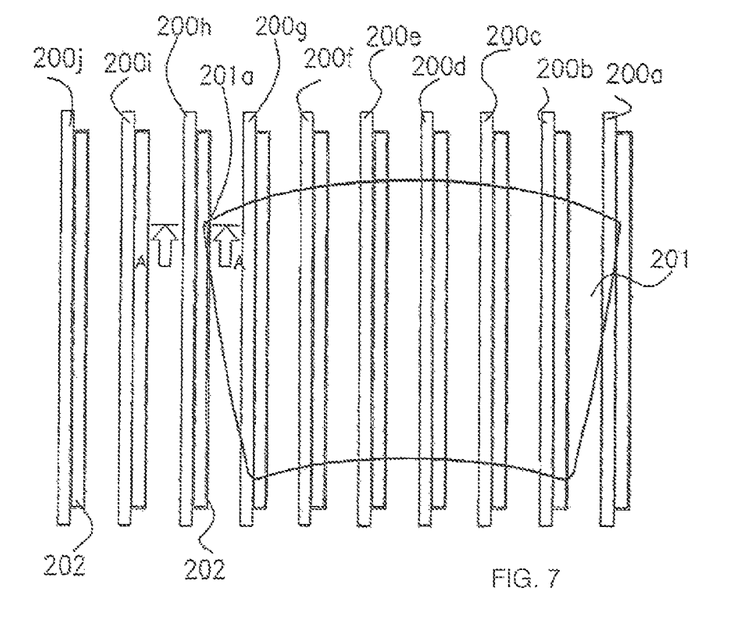
FIG. 7 illustrates a top view of glass board in printing position, and indicates the location where a margin printing should be performed.

FIG. 7 illustrates a top view of glass board in printing position, and indicates the location where a margin printing should be performed. A glass board (201) to be printed is illustrated in a printing position, supported by a horizontal support made of a plurality of spaced bars (200*a*) to (200*j*) each of which is provided on its right side with a collect tray (202) for demo printing.

Figure 7A:
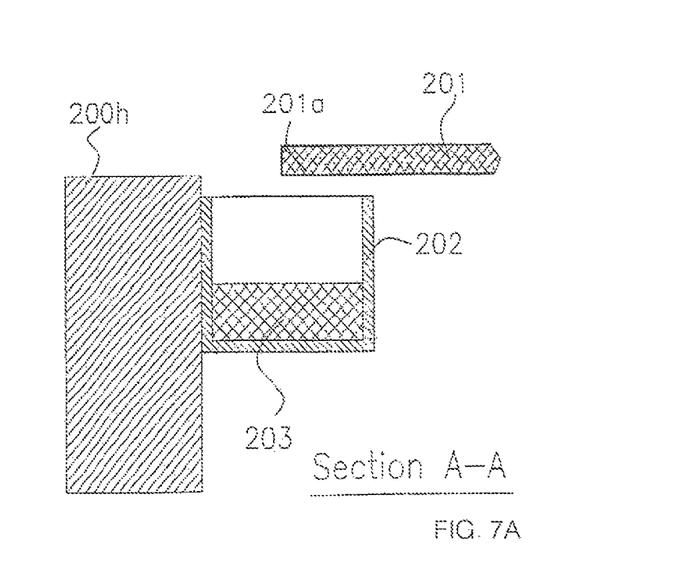
FIG. 7a illustrates a portion of what is illustrated by FIG. 7, in an enlarged transversal cross sectional view.

FIG. 7*a* illustrates a portion of what illustrated by FIG. 7, in an enlarged transversal cross sectional view. The corner (201*a*) of the glass board (201) should be printed, and therefore in order to prevent ink spoilage it is positioned from above a collect tray (202) which is attached to a respective bar (200*h*) of the horizontal support upon which rest the glass board in printing position. When the corner (201*a*) is printed, ink that may be injected beyond the edges of the glass board (201) is collected by the collect tray (202). The collect tray (202) may be equipped with a strip (203) of spongy material or cloth for receiving the ink The spongy strip (203) could be easily replaced from time to time, thus the collect tray could be maintained in a good condition for a long term period. The same collect tray could be utilized for demo printing when need rise to initialize a printing with the printing heads already in normal printing conditions (i.e. after acceleration and in normal speed and ink flow).

Figure 8:
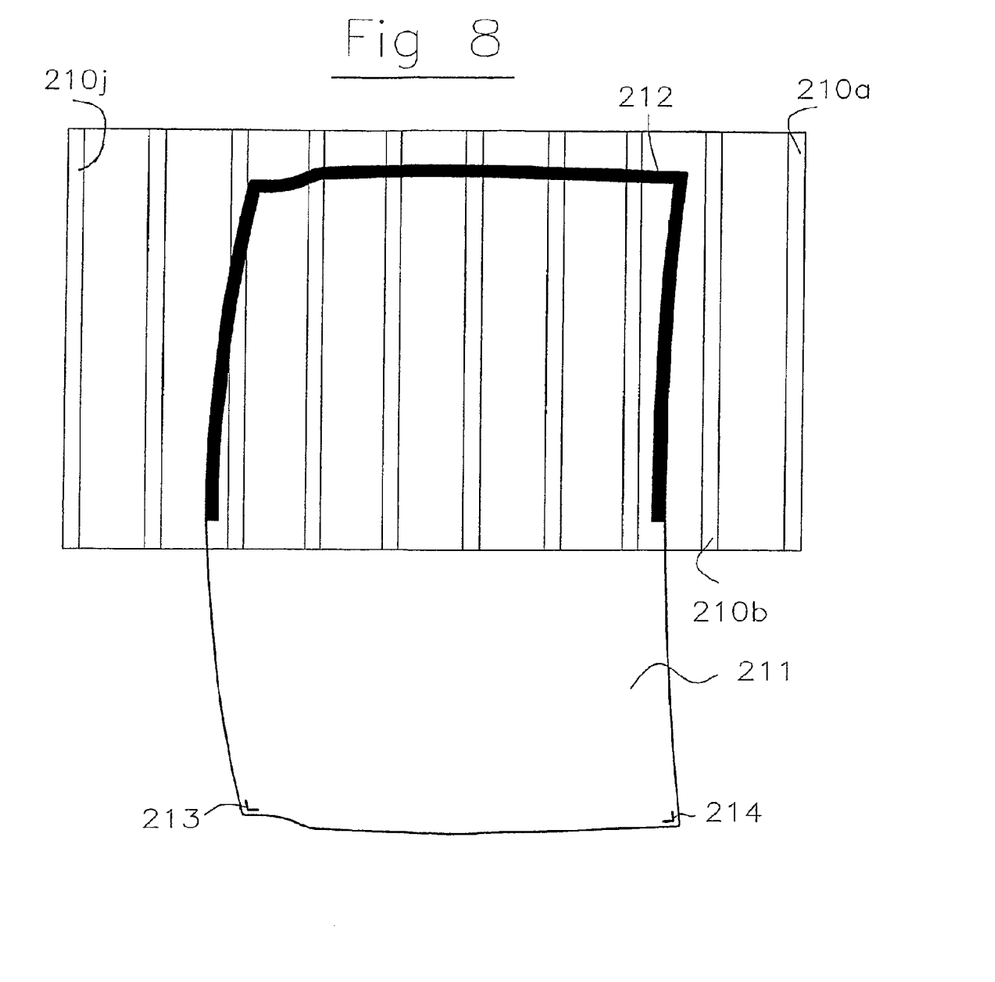
FIG. 8 illustrates top view of two step printing of oversized glass board, and pre-printing of test marks, according to the present invention.

FIG. 8 illustrates top view of two step printing of oversized glass board, according to the present invention. An oversized glass board (211) to be printed is illustrated in a first printing position corresponding to printable a sub section (212) being a first part from an oversized image to be printed. The oversized glass board is supported on a horizontal support made of a plurality of spaced bars (210*a*) to (210*j*). Upon completion of printing the first printable sub section (212) which corresponds to the glass board portion now located in the first printing position, the oversized glass board is shifted to a second printing position, and a corresponding printable subsection of the image is printed. This illustration relates to an oversized glass board which requires 2 stage printing for having a complete image. It could be appreciated however that 3, 4 or other number of multi stage printing stages could be performed in a similar manner (i.e. each printed sub section may be considered a first, respective to the next one), in case glass board oversize requiring such numbers of sub sections to be printed.

Another advantage of the digital ink jet glass printer according to the present invention, is the ability for facile pre-printing test. Pre-printing test is especially required when printing glass boards that are already cut to their final shape and size—and wherein the image to be printed has portions that are adjacent the margins of the glass boards, as is the case in the present figure. Pre-printing test marks (213) and (214) could easily be printed prior to printing the margins (212). This test marks will then be covered by the actual printing. The pre-printing test is not linked to multi stage printing, and is recommended whenever the material is already cut to its final shape and thus a deviation in the image positioning may not have a remedy later on by cutting the material according to the image location. Accordingly, the present invention provides for using cut and shaped glass plates, and printing them accurately. It can be appreciated that in screen-printing machine such pre-printing of test marks is not so facile, and requires a special frame to be prepared with the teat marks alone.

The invention claimed is:

1. A printing system for printing ink on glass boards, comprising:
   a horizontal support for a glass board;
   an ink-jet printing head supported by a bridge and moveable above the horizontal support;
   an ink fixation system including at least one elongated heater located parallel to the lateral bridge, fixed in the lateral direction and movable in the longitudinal direction along the glass board after the ink jet printing head, and thus it heats lateral strip portions of the glass board after being printed;
   wherein for tracing and printing curved lines the printing head is controllably pivoted about its vertical axis.

2. The printing system according to claim 1, wherein the horizontal support for a glass board is a table made of horizontally oriented spaced bars each having a top surface with upwardly oriented tips, configured to support the glass board.

3. The printing system according to claim 1, wherein the ink jet printing head supported by the bridge moves along the bridge laterally to the glass board to form X-axis movement, and the bridge is laterally oriented and movable perpendicularly to its lateral orientation to form Y-axis movement of the inkjet printing head.

4. The printing system according to claim 1, further comprising an ink supply system to provide through a circulation line glass-based ink having solid glass particles to the inkjet printing head and to maintain the ink provided to the inkjet printing head in a substantially unified heterogenic suspension.

5. The printing system according to claim 1 further comprising:
   a ventilation means;
   the ventilation means being associated with the elongated heater; and
the ventilation means configured to disperse the vapors and gasses released from the ink after printing and during a fixation process.

* * * * *